Figure 1:
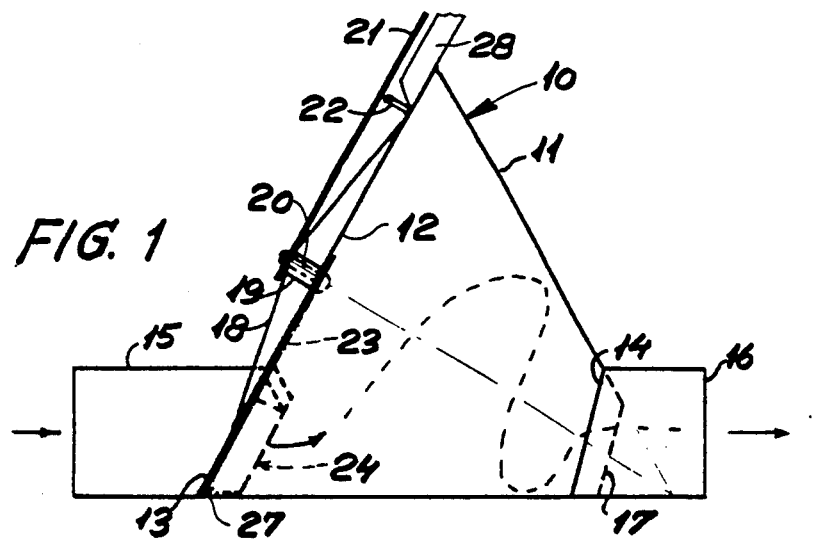

United States Patent [19]

Johannessèn

[11] Patent Number: 4,679,595
[45] Date of Patent: Jul. 14, 1987

[54] DEVICE FOR CONTROLLING THE FLOW IN A PIPE SYSTEM

[75] Inventor: Jorgen M. Johannessen, Køge, Denmark

[73] Assignee: Jørgen Mosbaek Johannessen ApS, Denmark

[21] Appl. No.: 711,503
[22] PCT Filed: Jun. 29, 1984
[86] PCT No.: PCT/DK84/00063
§ 371 Date: Feb. 28, 1985
§ 102(e) Date: Feb. 28, 1985
[87] PCT Pub. No.: WO85/00446
PCT Pub. Date: Jan. 31, 1985

[30] Foreign Application Priority Data

Jun. 30, 1983 [DK] Denmark .............................. 3011/83

[51] Int. Cl.[4] .................................................. F15C 1/16
[52] U.S. Cl. .................................. 137/813; 137/556.6; 137/808; 239/463; 239/471
[58] Field of Search ............... 239/463, 468, 470, 471, 239/465, 474; 137/808–813, 556.6

[56] References Cited

U.S. PATENT DOCUMENTS

| | | | |
|---|---|---|---|
| 854,352 | 5/1907 | Hobart | 239/471 |
| 1,012,436 | 12/1911 | Ransome et al. | 239/463 |
| 1,079,327 | 11/1913 | Chadborn | 239/465 |
| 1,293,108 | 2/1919 | Judson | 239/468 |
| 1,390,048 | 9/1921 | Longe | 239/471 |
| 1,730,708 | 10/1929 | Wittenberg | 239/471 |
| 1,825,640 | 9/1931 | Wert | 239/468 |
| 1,882,241 | 10/1932 | Curran | 239/463 |
| 2,999,647 | 9/1961 | Soswick | 239/471 |
| 4,103,708 | 8/1978 | Huntington | 137/614.11 |
| 4,206,783 | 6/1980 | Brombach | 137/813 |

FOREIGN PATENT DOCUMENTS 806104 12/1936 France .............................. 137/556.6

Primary Examiner—A. Michael Chambers
Attorney, Agent, or Firm—Darby & Darby

[57] ABSTRACT

In an eddy current brake for controlling quantitative flow in a water line and with a brake housing in the shape of lying frustum of a cone with an outlet opening in the narrow end and an inlet opening downwardly on the large end face there is disposed a guide vane opposite the inlet opening within the housing, said guide vane being rotatable about the axis of the housing by means of an exterior adjustment lever between a position in which it closes the inlet, and a position in which it is disposed completely outside the inlet region and thus allows free flow. In intermediate positions the guide vane deflects the in flowing stream of water toward the frusto-conical wall so that the water, when the pressure head exceeds a certain valve, is caused to rotate about the axis of the housing to produce the desired brake effect. This effect can be varied by adjustment of the guide vane. Its deflecting effect permits the inlet spout and outlet spout of the brake housing to be disposed in elongation of each other.

12 Claims, 8 Drawing Figures

DEVICE FOR CONTROLLING THE FLOW IN A PIPE SYSTEM

The invention relates to a device for controlling the flow in a pipe system, such as a sewerage system, comprising a housing which is provided with a curved side wall and forms a vortex chamber, and which has an inlet opening and an outlet opening.

It is known from the U.S. Pat. No. 4,206,873 and the Danish Patent Application No. 5120/79 to brake a flow of liquid by passing it tangentially into a housing which has a substantially circular cross-section and forms a vortex chamber. It is common to these vortex brakes that it is a prerequisite for the eddy formation and thus the brake effect that the inlet to the brake housing is tangential to the housing and also substantially perpendicular to the outlet direction. However, a deviation of up to about 60° from the perpendicular or down to an angle of 30° with the axis is acceptable, provided that the wall toward which the inlet is directed is almost perpendicular to the outlet direction.

Within the liquid flow control field there is an increasing need for a more sophisticated control and a less problematic principle of incorporation. By more sophisticated control is meant the possibility of varying the brake effect of the brake housing within a very great interval and of simultaneously maintaining a very large flow cross-section in the control of small amounts. Less problematic principle of incorporation is taken to mean one which allows the brake housing to be inserted in a straight conduit.

The object of the invention is to provide a device of the stated type which satisfies the mentioned need.

This object is achieved by an adjustable guide vane in or opposite the inlet opening, said guide vane being so arranged and mounted as to be movable between an extreme position in which it is positioned substantially outside the inlet region, and operative positions in which it extends more or less across the inlet opening and gives the inflowing liquid a velocity component which forms an angle with the direction to the outlet opening. Then the movable guide vane enables deflection of the inflowing stream of water away from the inlet direction so that, at a certain pressure height at the inlet, the water is caused to follow a vortex path through the housing with a consequent brake effect. The degree of deflection and thus the pressure head where the eddy formation begins can be varied by adjustment of the guide vane. This adjustment can be made at the installation having regard to the actual flow conditions, but can of course always be corrected when the circumstances so demand, e.g. in case of changes in the pipe system in which the device is incorporated.

When the water is caused to rotate in the housing by a sufficiently great pressure head at the inlet, it will be whirled out against the curved side wall under the action of the centrifugal force and with continued inflow be displaced inwardly toward the central axis of the housing, where the number of revolutions increases because the water path per revolution becomes shorter with a decreasing radius. The inner water particles with the large number of revolutions will tend to entrain the most adjacent outside water particles with the same number of revolutions; this effect takes place through the entire body of water out to the periphery and results in a very great overall centrifugal pressure against the curved housing wall and a correspondingly great brake effect. Under these circumstances the water leaves the outlet as a tubular, thin-walled jet.

In practice, the device of the invention may have the shape of either a frustum of a cone and be arranged as stated in claim 2, or of a flat cylinder and be arranged as stated in claim 9.

Expedient details in the two shapes are defined in claims 3–8 and 10–11, respectively.

Figure 2:
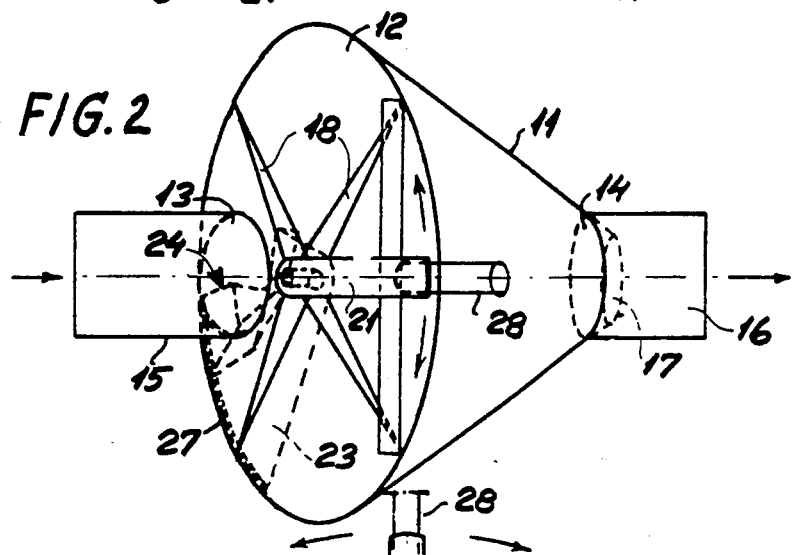
Figure 3:
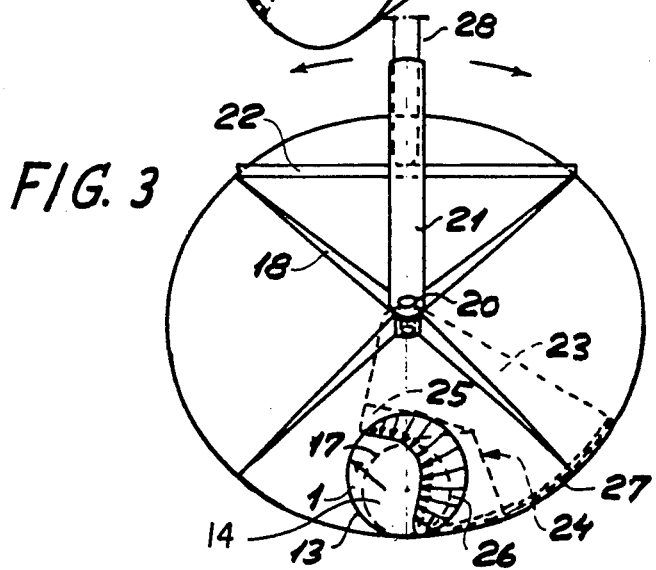
Figure 5:
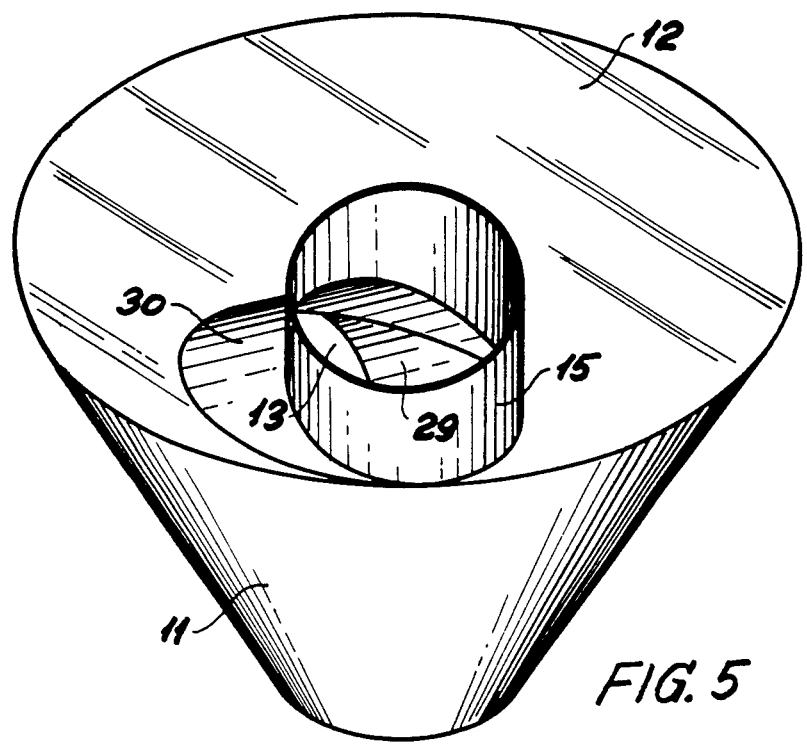
Figure 4:
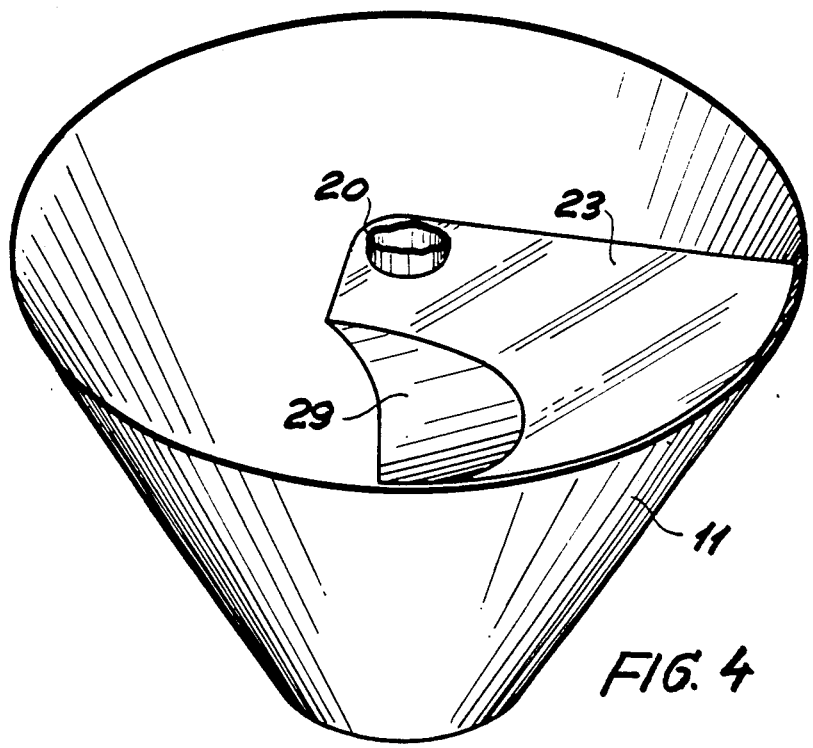
Figure 6:
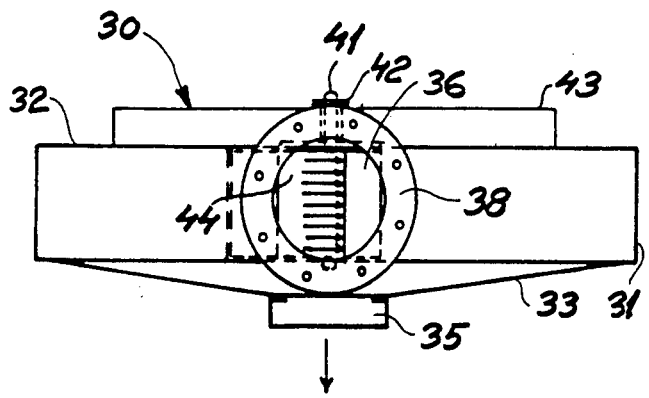
Figure 7:
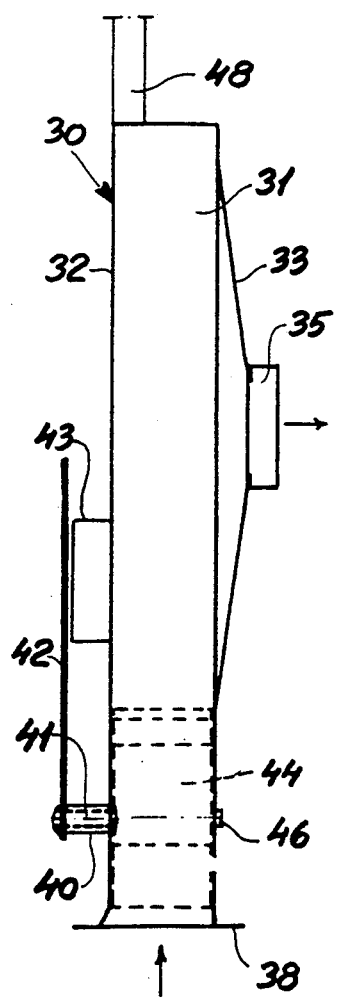
Figure 8:
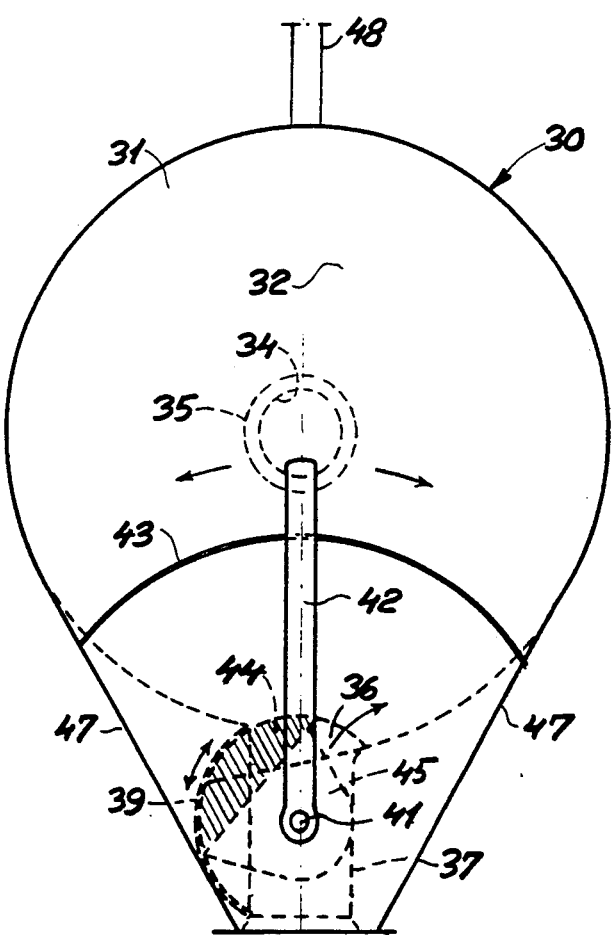

The invention will be explained more fully below with reference to the drawing, in which FIGS. 1, 2 and 3 show an embodiment of the device of the invention, seen from the side, from the top and from the inlet end, respectively, FIG. 4 is a perspective view of a modified embodiment of the guide vane and a sector plate on which it is mounted as well as a part of the housing, FIG. 5 is a perspective view of a modified embodiment of the inlet nozzle and a part of the housing, FIGS. 6, 7 and 8 show another embodiment of the device of the invention, seen from the inlet end, from the side and from the face opposite the outlet opening, respectively.

The device shown in FIGS. 1, 2 and 3, which is generally designated by 10, has a lying, frusto-conical brake housing 11 with an end wall 12, whose lower portion is formed with an inlet opening 13, and with an outlet opening 14 in the narrow end. The inlet opening 13 and the outlet opening 14 are connected to an inlet spout 15 and an outlet spout 16, respectively, both of which may be equipped with coupling flanges, insertion sleeves and various forms of valves, quantity flow meters and fittings in a generally known manner. A calibration ring 17 is shown in the outlet spout 16.

The exterior of the end wall 12 mounts stiffeners 18 and a bearing bushing 19, co-axial with the housing, for a through shaft 20. An adjustment arm or lever 21 movable across a scale plate 22 is secured to the shaft. Moreover, means (not shown) may be provided for holding the lever 21 in any desired position. The interior end of the shaft 20 mounts a substantially sector-shaped plate 23 which is held in close relationship with the end wall 12 by a flange 27 downwardly in the housing and whose one corner portion is replaced by a guide vane; the guide vane is generally designated by 24 and consists of two plates 25 and 26 inclined inwardly in the housing from the sector plate edges and inter-connected by two adjoining edges. Upon pivoting of the lever 21 the sector plate 23 and the guide vane 24 are moved between a position in which the sector plate closes the inlet opening 13 completely, and one in which the guide vane is entirely disposed outside the inlet opening. The extreme positions may be determined by stop means (not shown).

A vent pipe 28 is positioned on top of the brake housing 11. Instead of such a separate vent pipe, a tubular lever may optionally be used within communicates with the interior of the housing through a passage in the shaft 20. However, in may cases venting of the housing is not desirable at all, and it may therefore be expedient to manufacture the device with an upwardly closed vent pipe, which can then be opened by drilling of a hole in the top end, when so desired.

In the modified embodiment of the guide vane shown in FIG. 4, the guide vane is formed by a curved plate 29 which results in better flow conditions than the one shown in FIGS. 1-3. The plate 29 may e.g. be in the form of a portion of a cylinder face whose generatrix is directed obliquely into the housing 11.

The modified embodiment of the inlet spout 15 shown in FIG. 5 has a laterally directed extension at the inlet opening 13, said extension being defined by a curved plate 30 which may e.g. form part of a cylinder face with a generatrix which is substantially parallel with the generatrix of the guide vane 29.

When the adjustment lever 21 is pivoted to its outermost clockwise position in FIGS. 2 and 3, the sector plate 23 blocks the inlet and thus prevents throughflow. When the lever 21 is pivoted to its outermost counterclockwise position, the guide vane 24 or 29 will be disposed entirely outside the flow profile, with a free flow without brake effect. When the lever is placed in its middle position, the guide vane will be in the brake position, and with a moderate inflow the water impinges on the projecting part of the guide vane and turns over to the opposite side of the brake housing, from where it again slides back to the bottom and leaves through the outlet. In case of an increased pressure the effect is enhanced so that the water turns along the inner side of the housing before leaving through the outlet, and finally the entire amount of air, apart from an air column up through the centre of the brake housing, will be displaced through the outlet to provide full brake effect. When the water pressure falls again and declines to about the middle of the brake housing, the rotation becomes unstable, and air from the outlet end will return to the top of the housing and break the rotation so that the brake effect ceases and the flow increases abruptly and briefly, which causes any sedimented substances to be whirled up into the flow. At other intermediate guide vane positions the mode of operation is in principle the same, but the brake effect and thus the flow are different. The greater the opening, the smaller the brake effect, and the smaller the opening, the greater the brake effect. The characteristic of the discharge dependence upon the pressure head tends toward constant discharge at an increasing pressure because of increasing brake effect, but declining discharge at a declining pressure to the point where air penetrates and breaks the brake effect.

The embodiment of the device of the invention shown in FIGS. 6, 7 and 8, which is generally designated by 30, has a brake housing 31 substantially formed as a flat cylinder and with a plane end wall 32 and a low, frusto-conical end wall 33, whose centre is provided with an outlet opening 34 connected to an outlet spout 35. In the substantially cylindrical side wall the housing has a rectangular inlet opening 36 which is connected to an inlet spout 37 shown as equipped with a coupling flange 38. The three sides of the inlet spout are plane; but the fourth side 39 has the shape of a cylinder face with a cross-section of a circular arc and with an axis which is parallel with the axis of the brake housing 31.

A bearing bushing 40 for a shaft 41 is secured to the plane end wall 32 of the housing and co-axially with the curved wall 39 of the inlet spout; the shaft 41 extends through the end wall and its outer end mounts an adjustment lever 42 which is movable across a scale plate 43 shaped as a circular arc. A guide vane 44 in the shape of a cylinder segment co-axial with the shaft 41 is mounted on the interior end of the shaft 41 by means of an ear 45 coplanar with one end face. A similar ear on the other end face of the guide vane 44 has a short centering pin 46, which is co-axial with the shaft 41 and extends through a hole in the opposite side of the inlet spout 37. Pivoting of the adjustment lever 42 between the extreme clockwise and counterclockwise positions in FIG. 8, respectively, causes the guide vane 44 to be rotated between a position in which it closes the inlet opening 36 completely, and a position in which its plane inner side is parallel with the opposite side wall of the inlet spout 37 and thus allows free flow through the inlet spout.

In the shown embodiment the brake housing 31 has two additional plane side walls 47 extending from their respective sides of the inlet spout to the substantially cylindrical side wall of the housing tangentially thereto. Moreover, the brake housing may, as shown, be equipped with an overflow or vent pipe 48.

When the device 30 is in a horizontal position and the adjustment lever 42 is in its middle position in FIG. 8 (as illustrated), the guide vane 44 is in the brake position, and water will be deflected at the inlet along the substantially cylindrical side wall of the brake housing where it continues all the way round to the inlet. Due to continued in-flow, it will be forced closer to the outlet opening, and this effect continues until the brake housing is almost filled with water, and the water leaves the outlet opening as a thin-walled pipe which spreads as a fan owing to the centrifugal force caused by the rotation. In the centre of the brake housing there will be an air column which impinges on the plane wall 32 opposite the outlet opening. This effect gets more pronounced with an increasing degree of closure.

When the device 30 is in a vertical position and the adjustment lever 42 is in its middle position, the guide vane 44 is in the brake position, and the water runs up into the brake housing along the substantially clindrical brake housing side wall from where it falls back over itself and fills the lower part up to the outlet opening and is discharged from the outlet opening. In case of a moderate feed, inflow and discharge will be balanced at a constant water level in the brake housing. Increasing inflow rates cause the water to rise in the side of the brake housing where it is guided upwards along the curved wall. The water then assumes a position inclined toward the outlet opening, which is completely filled with water at this moment, and in its fall toward to the outlet opening it entrains air bubbles out through the outlet until the whole amount of air has been displaced and full brake effect has been obtained. The brake effect increases with increasing closure of the inlet cross-section with the guide vane 44. When the pressure and thus the inlet rate decline and the water level, exteriorly, has reached somewhat down on the brake housing, the rotation become unstable, and air will penetrate from the discharge side and break the brake effect. Provided with a vent pipe 48, the device enables easier displacement and repenetration of air with the same characteristic at an increasing and a falling pressure. Without a vent pipe the characteristic of the discharge dependence upon the pressure head tends towards a constant discharge at an increasing pressure because of enhanced brake effect and decreasing discharge at a falling pressure until the point where air again forces its way into the brake housing, and the discharge is increased abruptly and briefly.

The details of the shown and described structures can be modified in many ways within the scope of the invention. This applies to e.g. both the arrangement and the mounting of the guide vane and its adjustment means, which may optionally be designed to be controlled automatically, e.g. by a float.

I claim:

1. A device for controlling the flow of a liquid in a pipe system, comprising:

a housing having a curved side wall to form a vortex chamber therein, said housing having an inlet opening and an outlet opening oriented to allow free, unobstructed and substantially linear flow of said liquid through said housing from said inlet opening to said outlet opening in the absence of an angular velocity component in an inflowing liquid toward the housing side wall, an adjustable guide vane mounted within said housing and adjacent said inlet opening, said guide vane being movable between the first position in which it is positioned substantially away from said inlet opening so as to impart no angular velocity component to the inflowing liquid toward such side wall, and operative positions in which it extends at least partially across said inlet opening to give said inflowing liquid controlled amounts of a velocity component having a direction which forms an angle with the direction of the inflowing liquid to move said inflowing liquid to said side wall to create a vortex flow of liquid in said chamber which creates a braking effect.

2. A device according to claim 1 wherein said housing side wall has the shape of a frustum of a cone with the outlet opening, connected to an outlet spout, in the narrow end of said frustum, and wherein said inlet opening, connected to an inlet spout, is disposed in a lower part of the wide end face so that said inlet spout and outlet spout are substantially horizontal and co-axial with each other.

3. A device according to claim 2, wherein said inlet spout at said inlet opening of said housing is formed with a lateral extension defined by a curved wall which is substantially parallel with said guide vane.

4. A device according to claim 2 wherein said inlet opening is substantially circular, and wherein said guide vane is curved and arranged along an edge portion of a planar supporting plate which is pivotally placed on the inner side of and in close relationship with said wide end face, said edge portion substantially conforming with and being positioned along a part of the inlet opening circumference in one operative position of said guide vane.

5. A device according to claim 4 wherein said wide end face is circular and perpendicular to the axis of said frustoconcical housing, and wherein said guide vane supporting plate is substantially sector-shaped and is rotatable about the axis of said housing and has a size at the wide end face circumference sufficient to cover said inlet opening completely in an operative position of said guide vane.

6. A device according to claim 3, comprising:

an inclined plate extending obliquely from a part of said guide vane inwardly toward said guide vane supporting plate.

7. A device according to claim 4, wherein said guide vane supporting plate is firmly connected to a lever which is mounted on the exterior of said housing and is movable across a scale to rotate said guide vane supporting plate.

8. A device according to claim 7, wherein said lever is hollow and forms a vent pipe.

9. A device for controlling the flow of a liquid in a pipe system, comprising:

a housing substantially in the shape of a flat cylinder having end walls with an outer opening in one end wall and an inlet opening in the cylindrical housing wall, an inlet spout connected to said inlet opening to normally direct the flow of liquid into said housing substantially radially to the center of said cylindrical housing, a guide vane mounted in said inlet spout, means for moving said guide vane between a first position in which it is positioned substantially away from said inlet opening to allow free, unobstructed and substantially linear flow of an inflowing liquid substantially radially into the housing, and operative positions in which it extends at least partially and obliquely across said inlet opening to direct said inflowing liquid away from said radial direction to impart to it a controlled velocity component having a direction which forms an angle with the radial direction of inflow from said inlet opening so as to direct the inflowing liquid to the cylindrical wall to give a braking effect to the liquid as it travels from the inlet to the outlet.

10. A device according to claim 9 wherein said inlet opening and corresponding cross-section of said inlet spout are rectangular, and wherein said guide vane is in the shape of a cylinder segment having a plane side in said first position disposed in parallel with an opposite side wall of said inlet spout and defines, in combination with said side wall and two walls of said inlet spout perpendicular thereto, a cross-section corresponding to that of said inlet opening.

11. A device according to claim 9, wherein said guide vane, through its pivot, is firmly connected to a lever which is mounted on the exterior of said housing and is movable across a scale.

12. A device according to claim 9 wherein said radial inlet spout has a curved side wall along which an outer edge of said guide vane moves upon rotation of said guide vane.

* * * * *